Jan. 19, 1954

A. G. COOLEY 2,666,808

FACSIMILE MACHINE

Filed July 18, 1950

4 Sheets-Sheet 1

INVENTOR
AUSTIN G. COOLEY
BY John J. Rogan
ATTORNEY

INVENTOR
AUSTIN G. COOLEY
BY John J. Rogan
ATTORNEY

Jan. 19, 1954 A. G. COOLEY 2,666,808

FACSIMILE MACHINE

Filed July 18, 1950 4 Sheets-Sheet 3

INVENTOR
AUSTIN G. COOLEY
BY John J. Rogan
ATTORNEY

INVENTOR.
AUSTIN G. COOLEY
BY John J. Rogan
ATTORNEY

Patented Jan. 19, 1954 2,666,808

UNITED STATES PATENT OFFICE 2,666,808

FACSIMILE MACHINE

Austin G. Cooley, New York, N. Y., assignor to Times Facsimile Corporation, New York, N. Y., a corporation of New York Application July 18, 1950, Serial No. 174,379

17 Claims. (Cl. 178—13)

This invention relates to facsimile machines and more particularly to improvements in the blank loading and control mechanisms for such machines.

A principal object of the invention relates to an improved arrangement for automatically positioning a facsimile drum adjacent a sheet loading opening, and for simultaneously controlling the sheet clamping mechanism when the drum reaches the loading position.

Another object is to provide a novel sheet loading and clamping mechanism for facsimile machines, whereby the sheet or blank can be scanned with only one edge thereof clamped to the surface of the scanning drum.

Another object relates to a novel electrical and mechanical interlock between the drum and sheet loading arrangement whereby the drum can be automatically stopped at a fixed point adjacent a sheet loading slot to receive and clamp one edge of the sheet against the drum; and the drum is automatically maintained stationary after clamping until the receipt of a phasing impulse which automatically releases the drum for rotation.

A feature of the invention relates to a novel arrangement for loading a scanning drum with a sheet of subject matter to be scanned and for clamping one edge of the sheet to the drum.

Another feature relates to the automatic loading control mechanism which includes a time delay switch for controlling the electrical circuit of the drum driving motor to insure that the drum is brought up to the proper speed before scanning of the subject matter takes place.

A still further feature relates to the novel organization, arrangement and relative location of parts which cooperate to provide an improved facsimile machine.

Figure 1:
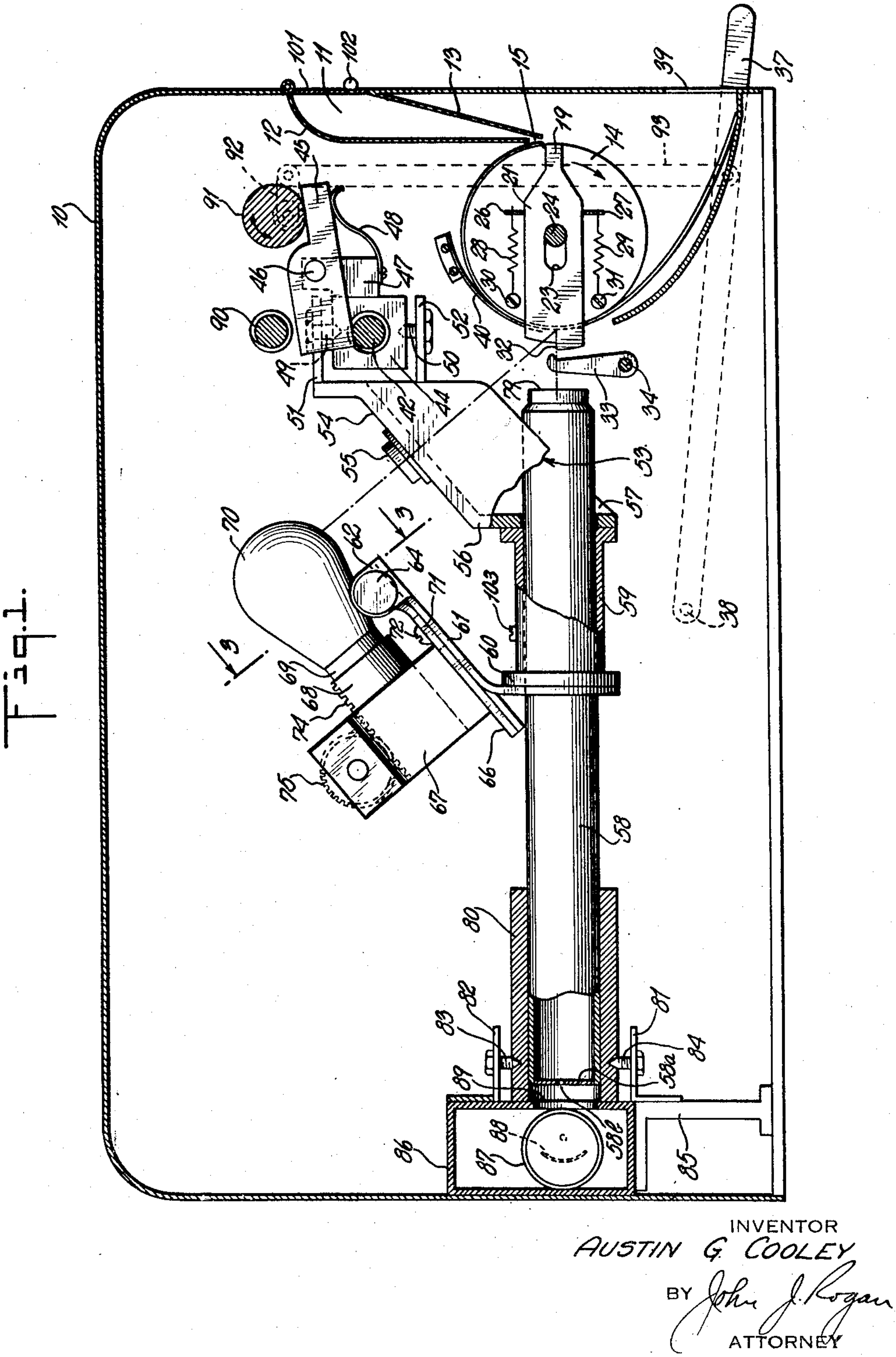
Fig. 1 is a left elevation view, partly sectional, of a facsimile scanning machine embodying features of the invention.
Figures 3, 4, 5:
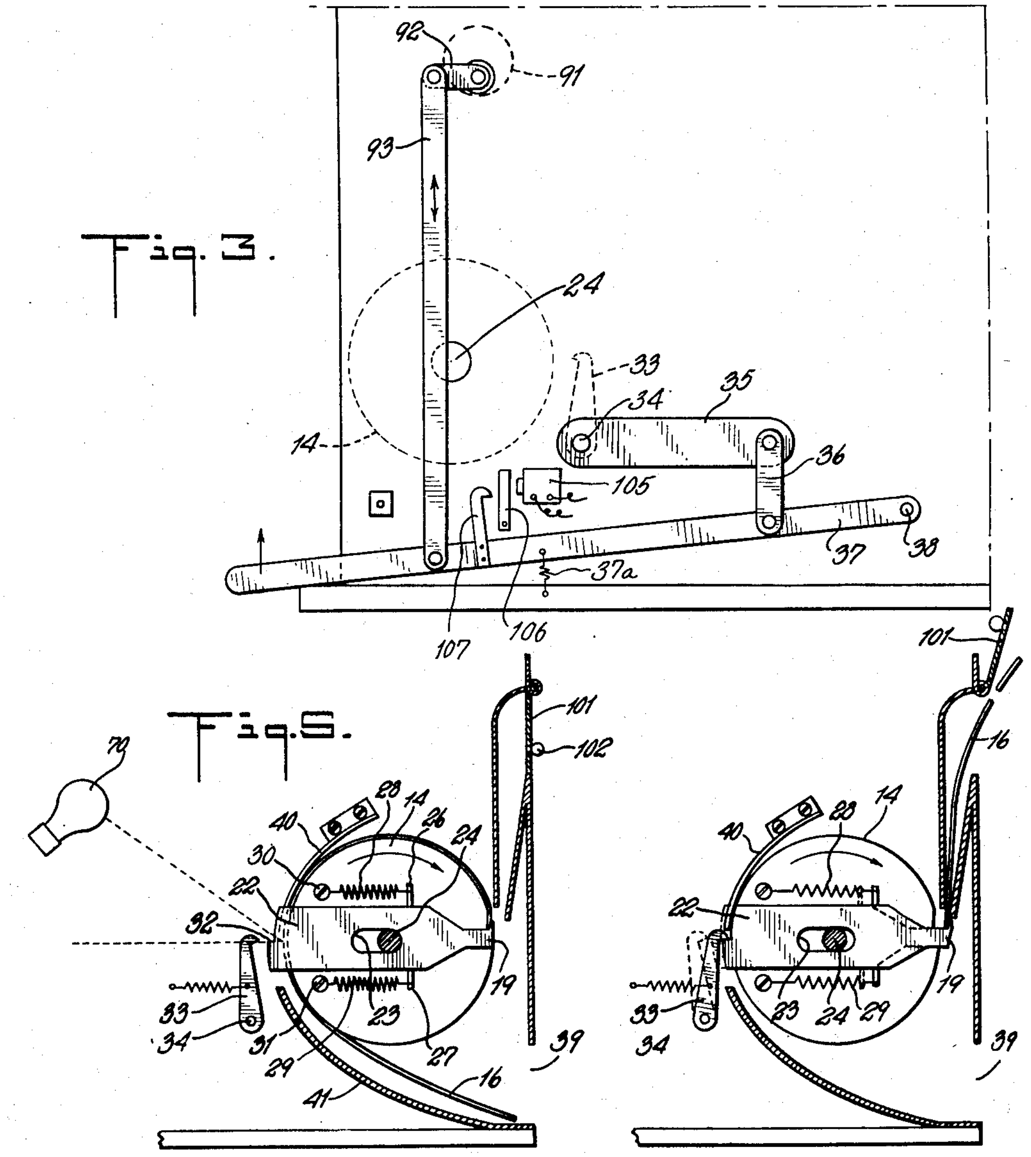
Fig. 3 is a right elevation view of part of Fig. 1.

Figs. 4 and 5 are detailed views of the sheet clamping and loading arrangement of Fig. 1; Fig. 4 showing the clamp released and ready to reload the scanning drum with the sheet; Fig. 5 showing the sheet in clamped position on the drum.

Figure 6:
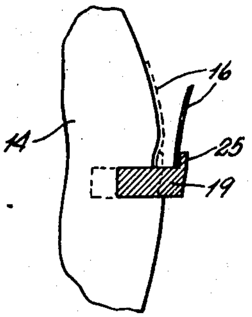

Fig. 6 is an enlarged sectional view of the sheet clamping bar of Figs. 1 to 5.

Figure 7:
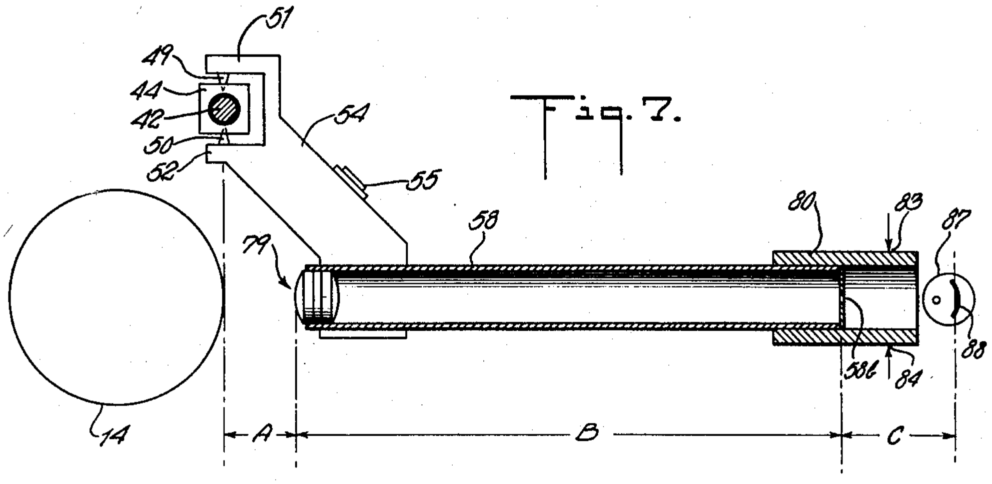

Fig. 7 is a detailed view of the pivotally mounted lens barrel showing more clearly its relation with respect to the scanning drum.

Figure 8:
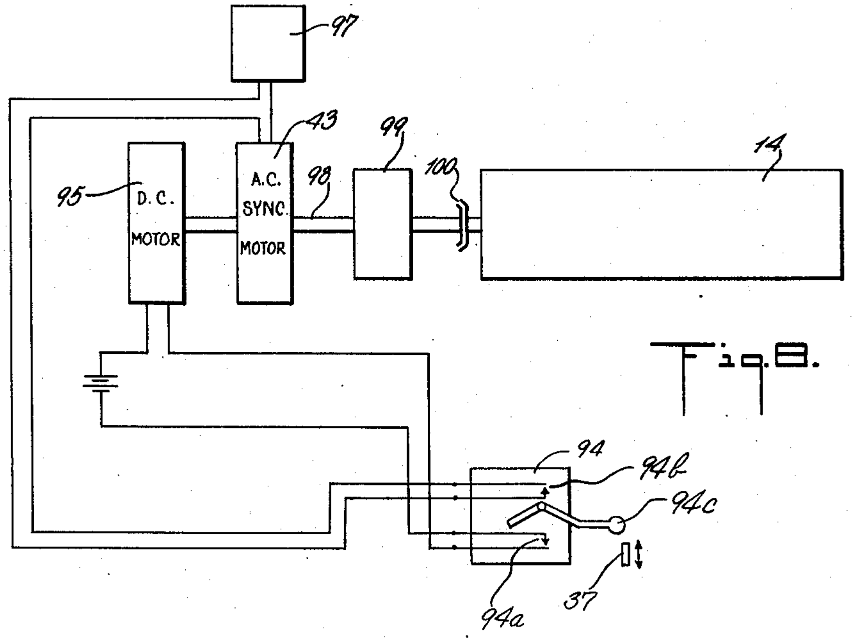

Fig. 8 is a schematic circuit diagram, mainly in block outline form, showing the motor control and clamping control lever interlock arrangement.

Referring to Fig. 1, the numeral 10 represents an enclosing casing for the machine, this casing having at its front wall an inlet hopper or guide 11 formed of two reentrant plates 12, 13, which extend the full length of the scanning drum 14, and converge adjacent the periphery of the drum to form a loading slot 15. A sheet of paper 16 or other similar material containing the subject matter to be scanned is dropped into the hopper 11 for loading on the drum as will be described in connection with Figs. 4 and 5.

Suitably supported for rotation in fixed bearing plates 17, 18, is the cylindrical scanning drum 14 which has a longitudinal slot in its periphery to receive the paper clamping bar 19 which, as shown in Fig. 6, has a longitudinally extending groove lip 25 adapted to receive and clamp the edge of the sheet 16 against the periphery of the drum. Rigidly fastened to the ends of bar 19, or integral therewith, are the slotted guide plates 21, 22, each having a slot 23, through which the ends of the drum shaft 24 extend. The guide plates 21 and the integral clamping bar 19 are normally held in position as shown in Figs. 1 and 5, wherein the face 25 of the clamping bar is substantially flush with the periphery of the drum, the remaining width of the bar 19 being seated in the abovementioned longitudinal slot in the drum. For this purpose, each of the plates 21, 22, has a pair of lugs 26, 27, and corresponding tension springs 28, 29, whose ends are fastened to the end walls of the drum by means of respective screws 30, 31.

The left-hand end of one of the plates 21 or 22 is provided with a lip 32 which is adapted to be engaged by a shiftable latch member 33. Member 33 is fastened to a rocker shaft 34 to which is also fastened the crank arm 35 (Fig. 3). The opposite end of arm 35 is connected by a link 36 to a lever 37, which is pivotally mounted at 38. The lever 37 extends through an opening 39 in the front wall of the casing 10 so that it may be raised or lowered. This opening also serves as an exit opening for removal of the sheet 16 after it has been completely scanned. The weight of the lever 37 in conjunction with a spring 37*a* may be such as to maintain it in its lowermost position as shown in Figs. 1 and 3. In this position, the latch member 33 is located out of the path of the lip 32 and the drum 14 is free to rotate. It should be observed that the plates 12 and 13 extend to, or short of, the ends of drum 14 so as to provide a clear path for the overhanging lip portions 32 when the drum is rotating. Mounted adjacent the upper rear quadrant of the drum 14 is a curved paper tension spring 40, which extends along the length of the drum and is adapted to hold the paper flat against the surface of the drum at the scanning region. Beneath the drum is located a curved stationary plate 41 which forms with opening 39 an exit hopper for the paper after it has been released from the drum.

Figure 2:
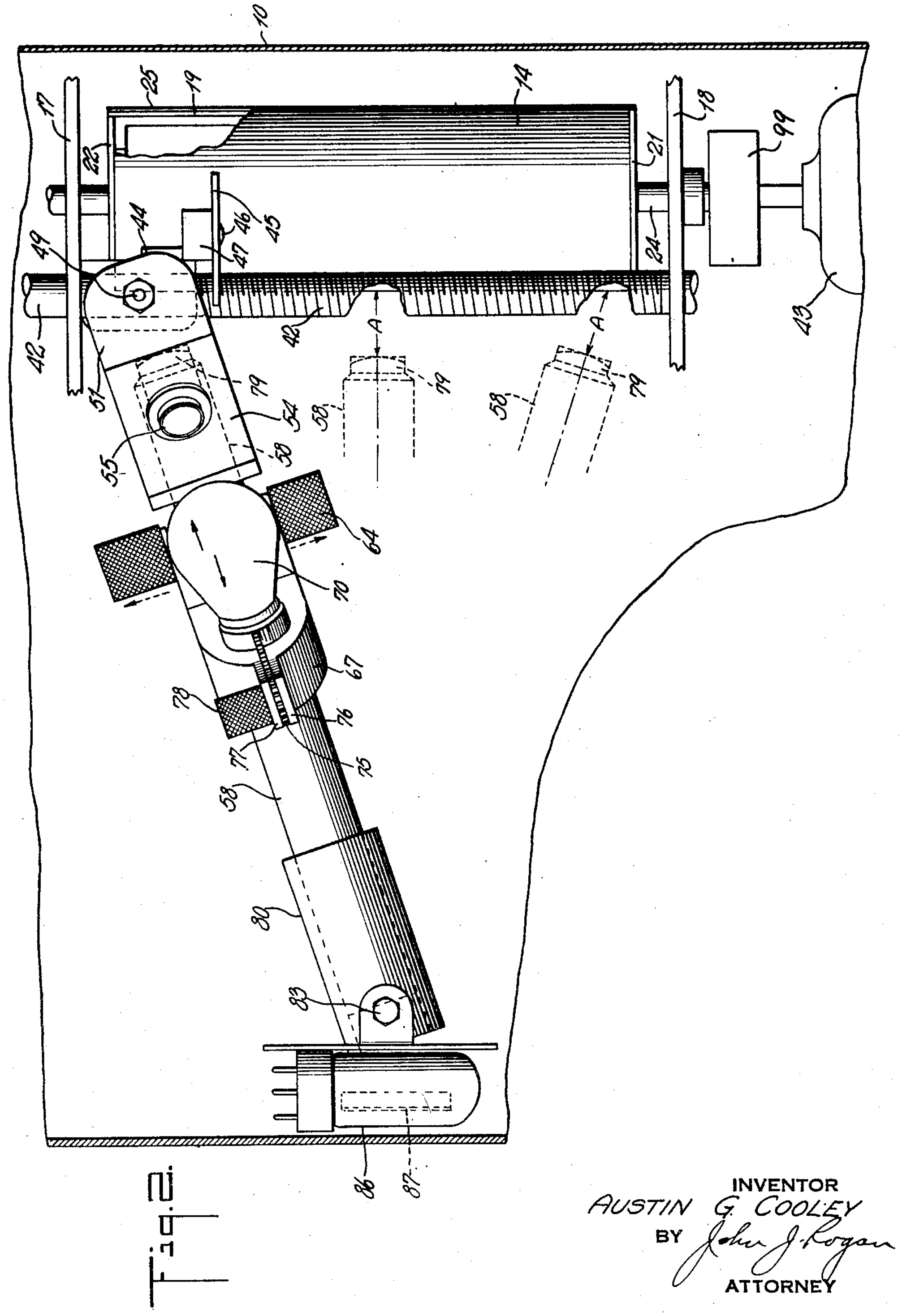
Fig. 2 is a top plan view of part of Fig. 1, with certain parts omitted for the sake of clarity.

Mounted for rotation in the bearing plates 17, 18, is a lead screw 42 (Figs. 1, 2 and 7), which is driven in predetermined and fixed speed relation with respect to the rotation of drum 14 by a suitable motor 43, through suitable reduction gearing (not shown) between the drum shaft and the lead screw 42. The screw 42 passes through a metal block 44 having a circular bore therein which is slightly greater in diameter than the peripheral diameter of the screw 42. The block 44 acts as a follower of the lead screw threads. For this purpose, a metal bar 45 is pivoted at 46 in an extension 47 on block 44. A leaf spring 48 engages the right-hand end of bar 45 and normally maintains the left-hand end of the bar in engagement with the lead screw threads. Swingably supported on the block 44 by means of adjustable pivot screws 49, 50, is a metal casting comprising two parallel horizontal arms 51, 52, through which the screws 49 and 50 are threaded, and an inclined bracket 53 U-shaped in section and which is integrally fastened to the plates 51, 52. The upper inclined wall 54 of bracket 53 has an opening to receive a suitable condenser lens in the lens barrel 55. The left-hand vertical wall 56 of bracket 53 has a circular opening 57 through which passes the light barrel tube 58 having a partition 58a with a central aperture 58b. Welded or otherwise fastened to the wall 56 is a cylindrical casting 59 (Fig. 1) having a bore of the same diameter as the opening 57. Welded or otherwise fastened to the flange 60 on casting 59 is a bracket having an inclined portion 61 with upturned lugs 62, through which are threaded respective thumb nut adjusting screws 64, 65. Supported on member 61 is a plate 66, which carries a block 67 having a circular bore to receive a slidable sleeve 68 which sleeve is adapted to frictionally grip the base 69 of the lamp bulb 70. The plate 66 is provided with a slot 71 through which passes a screw 72 threaded into the member 61. The plate 66 also has an upturned lug which is adapted to be engaged by the ends of the adjusting screws 64, 65, so as to adjust the bulb 70 in the direction of the dotted line arrows (Fig. 2). For the purpose of adjusting the bulb 70 in the direction of the full line arrows, the sleeve 68 carries a rack member 74 which is adapted to be engaged by a pinion 75 rotatably mounted between the spaced portions 76, 77, of the block 67. A suitable thumb nut 78 is provided for turning the pinion 75. By this arrangement, the lamp 70 can be moved so as to adjust its filament (not shown) or similar spot light emitter in mutually perpendicular directions so as to bring it into proper focal relation with the condenser lens in the lens barrel 55.

As above mentioned, the light tube 58 passes through the casting 59, and if desired the tube 58 may be adjustably fastened with respect to said casting so as to provide the proper spaced relation between the lens barrel 79 and the surface of drum 14. The light tube 58 at one end (Figs. 1, 2 and 7) is telescopically supported in a tube 80 which in turn is swingably mounted on fixed bracket members 81, 82, by means of pivot screws 83, 84. The external diameter of tube 58 is only slightly smaller than the internal diameter of tube 80, so as not to impede the telescoping sliding motion of member 58 in tube 80. Fixedly mounted with respect to the tube 58, for example on a suitable bracket 85, is a box or other housing 86 for the light-sensitive or photo-electric cell 87, whose sensitive target or emitting electrode 88 is positioned in alignment with the bore of tube 58. The front wall of box 86 has a wide rectangular window 89 of about the same size as the cell electrode 88. The cell 87 has its terminals connected to any suitable photo-electric cell amplifier (not shown) preferably by the shortest possible conductors so as to reduce to a minimum the possibility of extraneous electrical pickup.

From the foregoing description, it will be seen that the parts 51 to 79 form a unitary assembly, the movement of which is controlled by the lead screw 42 and the follower unit 44, 45. Because of the swinging and telescopically sliding support for the left-hand end of member 58, and because of the pivoted support of this unitary assembly on the block 44 by means of pivot screws 49 and 50, a substantially uniform spaced relation is maintained between the center of the front face of lens 79 and the surface of the scanning drum 14. In plan view (Fig. 2), the front center point of lens 79 traverses an arcuate path around pivot point 83, however the actual linear distance "A" (Fig. 7) between the said lens center and the point where the extended central axis of the optical system of tube 58 intersects the drum, remains fixed. As the light tube 58 swings, the distance "C" (Fig. 7) varies, while the distance "B" of course is fixed. It will be understood that the pivot point 83 is arranged so that it is equidistant from the ends of the drum 14. Consequently, when the tube 58 is perpendicular to the surface of the drum, the distance "C," is a minimum. As the tube 58 assumes a position on either side of this perpendicular position, the distance "C" becomes greater because the center point of the front of lens 79 approaches the drum so as to compensate for the increased angular relation between the central longitudinal axis of tube 58 and the surface of the drum. The net result is that the actual linear distance between the front center point of lens 79 and the point where the extended central longitudinal axis of tube 58 intersects the drum 14, remains a fixed value throughout the entire swinging motion of tube 58. It should also be observed that the lens 55 is maintained exactly in focus as the tube 58 swings between the scanning limits since the pivot screws 49 and 50 are in the plane of the scanning area of the drum.

When the scanning operation is completed, it is necessary to return the lens system to its initial or normal position, as shown in Fig. 2, and for that purpose an additional lead screw 90 (Fig. 1) is provided, this screw being located parallel to and above screw 42 and driven continuously by the motor 43. For the sake of clarity, screw 90 is omitted from Fig. 2. The screw 90 acts as a fast return screw and accordingly it has a much coarser pitched thread than the screw 44. The metal bar 45 engages an eccentric bail or cam 91 (Figs. 1 and 3) which is eccentrically mounted at its ends in the end plates 17 and 18, and extends the full length of the lead screws and parallel thereto. An arm 92 is fastened to the eccentric shaft of member 91 and this arm is pivotally attached to a link 93 which at its lower end is pivotally attached to the lever 37. Thus, when the lever 37 is raised, it rotates the member 91 in a counterclockwise direction causing the bar 45 to rotate clockwise around its pivot 46 so as to engage arm 45 in the thread of the return screw 90. The direction and pitch of the thread in screw 90 is such as to cause the lens system to be rapidly returned to its initial position as shown in Fig. 2. On the other hand, when the lever 37 is in its lowermost position, the member 91 is rotated clockwise enabling the arm 45 to rotate clockwise to the position shown in Fig. 1, and engage the thread in the main lead screw 42.

When loading the sheet 16 on to the drum, it is important that the drum be given sufficient rotational torque to insure that the member 19 is brought into registry with the loading hopper 11. For this purpose, there is mounted in the path of the lever 37 (Fig. 8) a delayed action switch 94 which completes the circuit through the winding of the starting motor 95. It should be observed that the drum 14 is adapted to be driven under control of two separate motors, namely the starting motor 95 which can be any suitable type of motor such as a direct current motor, and a synchronous motor 43 which is adapted to be driven at a predetermined synchronous speed under control of fixed frequency signals from a suitable source 97. The drum 14 can be coupled to the common shaft 98 of the two motors through a suitable gearing system 99 and a slip-friction clutch 100. By interposing the delay action switch 94 in the control circuit of motor 95, it is necessary that the lever 37 be raised relatively slowly so as to provide a certain minimum time of closure for the circuit of motor 95. If this delayed action switch were not provided and the lever 37 were suddenly raised, it would not enable the motor 95 to receive sufficient power to make sure that the drum 14 is brought to the loading position as shown in Figs. 4 and 6. The switch 94 may be of any well-known construction wherein a delay is produced between the closure of the respective contact sets when the switch arm is moved from one position to the other. Thus the switch may comprise a switch contact operating toggle 94*d*, which when fully "broken" downwardly, closes the contacts 94*a*, and when fully "broken" upwardly, closes the contacts 94*b*. This delay may be brought about by the fact that when the toggle is approaching its center or unbroken position, it momentarily locks, thus delaying the breaking of the toggle in the opposite direction and delaying the movement of lever 37. The lever 37 is arranged during its upward and downward movement to engage the projecting arm 94*c* of the toggle switch. When the arm 94*c* is moved upwardly by engagement with lever 37 during the initial upward portion of that lever's movement, it closes the circuit for the direct current starting motor 95. As the lever 37 continues its upward movement, the toggle remains "broken" downwardly. However as pointed out above, the latch 33 is not in a position to engage the stop lug 32 on member 22 until the said lever 37 is in its completely raised position. This insures that the motor 95 has sufficient time to operate to bring the stopping lug 32 into engagement with the latch 33. The switch 94 may be of any well-known construction which will immediately close the contacts and delay the travel of the lever 37 that moves the latch 33 in the engagement with the lip 32 of the plate 21. The switch 94 may be of any type well known in the art wherein two sets of contacts are provided, each set including a fixed contact and a movable contact and a toggle-operating member is mounted between the contacts so that when the switch arm is in its central position, neither set of contacts is closed. When the switch arm is operated to one side, it closes one set of contacts and when it is operated to the other side, it closes the other set of contacts. By a suitable design of the toggle, the toggle can be given a momentary delay or locking action in its central position so that it is not possible to switch from one set of contacts to the other with rapidity because of the momentary locking delay of the toggle mechanism in moving from one set of contacts to the other. Such switches are well-known in the art, and a typical example is that sold by Cutler Hammer and known as single pole or double pole "Lever Lock Switches."

Likewise, when the sheet has been properly loaded and clamped on to the drum, it is necessary to transfer control from the motor 95 to the motor 43. Consequently, when the lever 37 is lowered from its raised position as represented by the dotted line in Fig. 8, to its normal position, it again re-engages the operating arm of switch 94. If the lever 37 is moved downwardly sufficiently slowly, it maintains the circuit of motor 95 closed for a predetermined time interval sufficient to bring the drum 14 up to or close to synchronous speed. Consequently, when the lever 37 reaches its lowermost or normal position, the drum 14 being close to synchronous speed, can then be driven under control of the synchronous signals applied to the motor 43 from the source 97.

The manner of operation of the mechanism will be clear from the foregoing description. When the drum 14 is to be loaded preliminary to scanning, the lever 37 is raised causing the member 33 to engage the lip 32 to stop the drum. The inward movement of member 33 also forces the clamping bar 19 to the right (Figs. 1 and 4) so that the lip 25 is in alignment with the loading slot 15. A sheet of paper 16 is then dropped into the hopper 11 so that the lower edge thereof enters the slot formed between the lip 25 and the drum surface. Preferably the hopper 11 is normally closed by a hinged cover 101 having a knob 102. It will be understood that preferably the sheet 16 has a length substantially equal to the circumference of the drum 14. Suitably mounted in fixed position is an electromagnet 105, which controls a pivoted armature 106, adapted to cooperate with a latch member 107 fastened to the lever 37. When the magnet 105 is deenergized, the armature 106 is in a position to engage the lip of the latch 107 when the lever 37 is manually raised, thus holding the said lever in its raised position. The mechanism therefore stays in this condition until the receipt of an electrical phasing impulse from a distant transmitter. This impulse energizes magnet 105 to withdraw armature 106 from engagement with latch 107 permitting the lever to be pulled downwardly by spring 37*a* and causing the bar 19 to clamp the edge of sheet 16 flush against the periphery of drum 14, which is thereupon free to rotate and carry with it the clamped sheet of paper in the direction of the arrow. As indicated in Fig. 5, the opposite end of the sheet 16 is unclamped but is prevented from flapping around to any great extent by the member 41. When the clamped sheet reaches the scanning region which is illuminated by the lamp 70 and the optical system 55, it is held flat against the surface of the drum by the tension spring 40. It will be understood that the lamp 70 is of a type which produces a substantially point light source and this point source is focussed by the lens system 55 upon an elemental area of the sheet 16 as the drum is being rotated as indicated by the dot-dash line (Fig. 1). The scanning point of light traverses the sheet 16 in a direction parallel to the axis of rotation of the drum in the well-known manner. The light from the illuminated elemental scanning spot on the sheet 16 is likewise reflected through the lens system 79 so as to excite the photo-electric cell 87 in the well-known manner. When the scanning of the sheet has been completed, the lever 37 can again be raised so as to unclamp the sheet which is thereupon allowed to drop through the exit opening 39. Preferably, although not necessarily, the light tube 58 is adjustable with respect to the casting 59 and may be held in place therein by means of suitable set screws 103.

This application is a continuation-in-part of application Serial No. 721,085, filed January 9, 1947, issued as U. S. Patent No. 2,524,651.

What is claimed is:

1. In combination, a rotatable blank carrier, motor means to rotate said carrier, a circuit for said motor, switch means for controlling said circuit, means cooperating with said carrier to fasten at least one end of the blank thereagainst, means including said motor for rotating said carrier to bring it into blank loading position, other means effective to stop said carrier at said blank loading position, and for simultaneously releasing said blank fastening means, a phasing control device for holding said blank fastening means in loading position, and means for operating said phasing device in response to a phasing signal to cause said blank fastening device to fasten the blank against the carrier and to release the carrier and blank for continuous scanning rotation.

2. In a facsimile machine and in combination, a rotatable drum to receive a flexible sheet to be scanned, a motor for rotating said drum, means carried by said drum to engage and retain at least one end of the sheet on said drum and for rotation with the drum, said drum having a predetermined fixed rotary position at which the sheet is to be loaded thereon, a phasing control device for holding said drum in said loaded position pending the receipt of a phasing signal means automatically effective when a sheet is to be loaded on to the drum for rotating the drum to its fixed loading position and for stopping it at said position, means cooperating with said phasing device and effective when said drum stops at said loading position for releasing said sheet engaging means and thereafter responsive to the operation of said phasing device for automatically causing said engaging means to fasten the sheet to the drum and for automatically causing the drum to rotate to wrap the sheet thereabound.

3. In a facsimile machine and in combination, a rotatable scanning drum, motor means for rotating said drum, means for guiding into loading relation with said drum a sheet to be scanned, means for causing said motor means to rotate said drum to bring it to a fixed rotational loading position in registry with said guiding means, a phasing control device for holding the drum in said loaded position, sheet-fastening means carried by the drum and automatically released when the drum reaches its loading position to receive at least one end of said sheet, means for operating said sheet-fastening means to fasten the loaded sheet to said drum, means including said phasing device for locking said sheet-fastening means in its released position until the receipt of a phasing signal, and means responsive to said phasing signal to operate said phasing control device to cause said fastening means to fasten the sheet against the drum and also to release the drum and sheet for continuous scanning motion.

4. In a facsimile machine and in combination, a rotatable scanning drum, motor means for rotating said drum, means for guiding and automatically fastening to said drum a sheet to be scanned, a phasing control device which controls the fastening and unfastening of said sheet with respect to said drum means effective under control of said phasing device and when the sheet has been loaded onto the drum for re-operating said motor means to rotate the drum and sheet continuously for scanning.

5. In a facsimile machine and in combination, a rotatable scanning drum, motor means for rotating said drum, means effective when a sheet is to be loaded onto said drum for rotating said drum to bring it to a predetermined loading position, a phasing control device for automatically holding said drum at said loading position pending the receipt of a phasing signal, sheet gripping means carried by said drum, means effective upon the said stopping of said drum to operate said sheet gripping means to receive at least one end of the sheet to be gripped, means effective after said sheet has been received by said gripping means and controlled by said phasing device to cause said sheet to be gripped to said drum and for causing said drum and sheet to be rotated continuously for scanning.

6. In a facsimile machine and in combination, a rotatable scanning drum, a stationary sheet loading guide having an exit opening adjacent said drum, a sheet clamp carried by said drum and normally pressing against said drum, motor means for rotating said drum, drum stopping means effective in one position to stop the drum with said clamp in registry with said exit opening, a phasing control device for controlling said clamp, and delayed action switch means for closing the motor circuit to insure rotation of the drum sufficiently to bring said sheet clamping means into registry with said exit opening before stopping of the drum.

7. In a facsimile machine and in combination, a rotatable scanning drum, stationary sheet guiding means having an exit opening adjacent said drum, a sheet clamp carried by said drum having two positions in the first of which positions it is spaced from the drum to receive an end of the sheet projecting through said exit opening, and in the second of which positions it clamps said sheet against the drum, drum stopping means carried by the drum, a shiftable latch mounted in the path of said drum stopping means to stop the drum with said clamp in registry with said exit opening, means coupling said drum stopping means and said clamp for operation as a unit to cause said clamp to be moved to its said first position when it arrives in registry with said exit opening, and means to operate said latch in response to a received phasing signal to clamp said sheet to said drum and to release said drum and clamped sheet for continuous scanning rotation.

8. In a facsimile machine and in combination, a rotatable scanning drum, motor means for rotating said drum, stationarily mounted sheet guiding means having an exit opening adjacent said drum, a sheet clamp carried by said drum and having two positions in the first of which positions it is in sheet receiving condition, and in the second of which positions it is in a sheet clamping condition, a drum stop carried by the drum, a shiftable phasing control latch for engaging said drum stop to stop the drum with said clamp in position to receive at least one end of said sheet, means effective when said stop is engaged by said latch for moving said clamp to its said first position; means separate from said drum for operating said latch means in response to a phasing signal, and a circuit for said motor controlled by the operation of said latch operating means.

9. In a facsimile machine and in combination, a rotatable scanning drum, motor means for rotating said drum, a shiftable clamp carried by said drum, means including a manually operable member effective in one position to stop said drum and for substantially simultaneously releasing said clamp to receive an end of said sheet to be scanned, a phasing control device for holding said member in its drum-stopping position, said member being effective in another position to cause said clamp to clamp said sheet end against said drum, and means controlled by said phasing device for allowing the drum and clamped sheet to rotate continuously for scanning.

10. In a facsimile machine and in combination, motor means for rotating said drum, a shiftable clamp carried by said drum, means including a manually operated member effective in one position to stop said drum and for substantially simultaneously releasing said clamp to receive an end of a sheet to be scanned, said member being effective in another position to cause said clamp to clamp said sheet end against said drum, electromagnetic means for holding said member in its drum stopping position, said electromagnetic means being controlled by a received phasing signal to release said member to its said other position and also to release the drum and clamped sheet for continuous scanning rotation.

11. In a facsimile machine and in combination, a rotatable scanning drum, motor means for rotating said drum, manual means effective when a sheet is to be loaded onto said drum to close the motor circuit to bring said drum to a predetermined sheet loading position and for automatically stopping said drum at said position, means carried by said drum to receive and clamp an end of said sheet to said drum at said loading position, said stopping means and clamp means being coupled for simultaneous operation whereby the drum cannot begin to rotate for continuous scanning until said sheet is clamped to the drum.

12. In a facsimile machine and in combination, a rotatable scanning drum, means to automatically clamp a sheet to said drum, a scanning head arranged to traverse said drum longitudinally, motor means for said drum and head, a high speed drive between said motor and head, a low speed drive between said motor and head, means effective in one position to close the motor circuit to bring the drum to a predetermined fixed loading position without stopping said motor and for substantially simultaneously coupling said head to said high speed drive to return said head to a normal position, said means being effective in another position to control the clamping of said sheet to said drum and to release said drum for rotation after clamping of the sheet to said drum and also for automatically coupling said head to said low speed drive.

13. In a facsimile machine and in combination, a rotatable scanning drum, motor means for rotating said drum, a scanning head arranged to traverse the drum longitudinally, motor means for rotating said drum and for traversing said scanning head, a circuit for said motor, a switch for said circuit, switch operating means having two positions, coupling and decoupling means between said motor and said scanning head, drum stopping means, said switch operating means being linked to said coupling and decoupling means so that when said switch operating means is in one position said head is automatically returned at high speed to a normal position and when said switch operating means is in another position said head is traversed longitudinally of said drum at a low speed.

14. In a facsimile machine and in combination, a rotatable sheet carrying drum, a latch for stopping said drum at a predetermined sheet loading point, a manually operable member for operating said latch, electromagnetic phasing control means for holding said latch in drum stopping position pending the receipt of a phasing signal, and means also controlled by said member for clamping and unclamping the sheet with respect to said drum.

15. In a facsimile machine and in combination, a rotatable sheet carrying drum, a device for stopping said drum at a predetermined sheet loading position, a phasing control device for maintaining said stopping device in its drum-stopping position, a manually operable member for operating said device to stop said drum, motor means for rotating said drum, a circuit for said motor means, a switch for said circuit controlled by the operation of said member, a scanning head, a high speed lead screw, a low speed lead screw, means effective when said member is operated to stop said drum to couple said scanning head to said high speed lead screw, and means effective when said member is operated to release said drum for scanning, to couple said head to said low speed lead screw.

16. In a facsimile machine and in combination, a rotatable sheet-carrying drum, a device for stopping said drum at a predetermined sheet loading position, a phasing control device for maintaining said stopping device in its drum-stopping position, a manually operable member for operating said device to stop said drum, motor means for rotating said drum, a circuit for said motor means, a switch for said circuit controlled by the operation of said member, a scanning head, a high speed lead screw, a low speed lead screw, means effective when said member is operated to stop said drum to couple said scanning head to said high speed lead screw, means effective when said member is operated for releasing said drum for scanning to couple said head to said low speed lead screw, said drum carrying a shiftable sheet clamp, and means operatively interconnecting said clamp and said member for mechanically actuating said clamp under control of said member while also controlling the circuit of said motor.

17. In a facsimile machine and in combination, a scanning drum, a first motor for initially bringing said drum up to a predetermined scanning speed, another motor controlled by synchronizing signals to maintain said drum at a uniform scanning speed, respective circuits for said motors, respective switch means for said circuits, said switch means including a shiftable switch member which is operable between switch-operating limits and which is mechanically delayed in its movement between said limits, a stopping mechanism for said drum, a manually operable member for actuating said drum stopping mechanism and for operating said switch means, said member being operatively interconnected with said switch means to insure that the drum is initially rotated to a drum loading position before stopping of the drum, and means to clamp a blank to said drum, the last-mentioned means being also operatively interconnected with said member.

AUSTIN G. COOLEY.

References Cited in the file of this patent

UNITED STATES PATENTS

| Number | Name | Date |
|---|---|---|
| 1,379,528 | Clark | May 24, 1921 |
| 2,049,917 | Mallina | Aug. 4, 1936 |
| 2,083,044 | Storck | June 8, 1937 |
| 2,295,572 | Finch | Sept. 15, 1942 |
| 2,311,803 | Wise et al. | Feb. 23, 1943 |
| 2,354,571 | Blain | July 25, 1944 |
| 2,398,646 | Karbach et al. | Apr. 16, 1946 |
| 2,431,360 | Philpott | Nov. 25, 1947 |
| 2,451,079 | Finch | Oct. 12, 1948 |
| 2,451,080 | Finch et al. | Oct. 12, 1948 |
| 2,514,974 | Schauer | July 11, 1950 |